United States Patent [19]

Dujardin et al.

[11] Patent Number: 5,512,339

[45] Date of Patent: Apr. 30, 1996

[54] DECOMPOSABLE PACKING MATERIAL

[75] Inventors: Ralf Dujardin; Rolf Dhein, both of Krefeld; Martin Wandel, Dormagen, all of Germany

[73] Assignee: Bayer AG, Leverkusen, Germany

[21] Appl. No.: 139,869

[22] Filed: Oct. 22, 1993

Related U.S. Application Data

[63] Continuation of Ser. No. 754,062, Sep. 3, 1991, abandoned.

[30] Foreign Application Priority Data

Sep. 15, 1990 [DE] Germany .......................... 40 29 327.0

[51] Int. Cl.$^6$ ................................ B29D 22/00; B32B 1/08
[52] U.S. Cl. ........................ 428/35.7; 428/35.5; 428/220; 525/425; 525/433; 525/938
[58] Field of Search .................................... 525/425, 433; 428/220, 35.7

[56] References Cited

U.S. PATENT DOCUMENTS

| | | | |
|---|---|---|---|
| 4,820,771 | 4/1989 | Mussig et al. | 525/183 |
| 5,137,688 | 8/1992 | DeRudder | 422/22 |
| 5,225,490 | 7/1993 | Tokiwa et al. | 525/176 |

FOREIGN PATENT DOCUMENTS

| | | | |
|---|---|---|---|
| 0347687 | 2/1989 | European Pat. Off. . | |
| 3332924 | 5/1985 | Germany | 525/433 |
| 2-296863 | 12/1990 | Japan | 525/433 |

OTHER PUBLICATIONS

Derwent Accession No. 91–068 331, Questel Telesystems (WPIL) Derwent Publications Ltd. London, Abstract & JP-a-03-015 469 (Tahei San Sho).
Patent Abstracts of Japan unexamined application, C Field, Band 5, Nr. 71, 13, Mai 1981 The Patent Office Japanese Govt. Seit 135 C 54.

Primary Examiner—Ana L. Carrillo
Attorney, Agent, or Firm—Connolly & Hutz

[57] ABSTRACT

This invention relates to decomposable polyamide masses for packaging materials containing 5 to 25% by weight of an addition of linear, oligomeric aliphatic polyesters or polycarbonates with molecular weights from 800 to 4000. These additives preferably consist of polyesters of aliphatic diols and dicarboxylic acids having up to 10 carbon atoms or aliphatic carbonates having up to 10 carbon atoms.

The use of such mixtures for easily degradable, decomposable polyamide packages is also claimed, in particular in the form of films or thin walled injection moulded parts for (food) packaging.

16 Claims, No Drawings

DECOMPOSABLE PACKING MATERIAL

This application is a continuation of application Ser. No. 07/754,062 filed Sep. 3, 1991, now abandoned.

This invention relates to decomposable polyamide masses for packaging materials containing from 5 to 25% by weight of an addition of linear, oligomeric aliphatic polyesters or polycarbonates having molecular weights from 800 to 4000. These additives preferably consist of polyesters of aliphatic diols and dicarboxylic acids in each case with up to 10 carbon atoms or aliphatic polycarbonates having up to 10 carbon atoms.

The use of such mixtures for easily degradable, decomposable polyamide packages is also claimed, in particular in the form of films or thin walled injection moulded parts for (food) packaging.

The resistance of polymeric materials to microbial damage is a fundamental requirement for their use in the construction industry, apart from the necessary material properties. When required for such long term use, e.g. more than 10 years in the motor vehicle industry, it is necessary to ensure for safety reasons that the mechanical properties of the construction materials will not be impaired by microbial attack.

Packaging materials, on the other hand, are short lived products which are discarded after use. The requirements to be met by a packaging material as regards its ability to withstand mechanical stress by tension, pressure, bending or impact are, however, just as high as in the case of materials required for long term use. High values for elongation at break, tensile strength and flexural strength, modulus of elasticity and impact strength are therefore important criteria in choosing a polymer for packaging purposes. The chosen mechanical properties, however, lead to the production of plastics packages which give rise to high bulk waste products in spite of their low weight. It would therefore be desirable for reasons of reducing the amount of waste to have plastics with good mechanical properties for packaging purposes, which would be degraded under certain environmental influences such as direct sunlight and moisture or moisture and microbes and would give rise to decomposition products which would subsequently be biologically degraded by microorganisms.

Polyamides are used as packaging materials in many fields on account of their good mechanical properties. They are distinguished by high elongation at break and high tensile strength and flexural strength.

Further, polyamides, especially those based on polycaprolactam, and polyhexamethylene adipates based on aliphatic dicarboxylic acids and aliphatic diamines having 4 to 6 carbon atoms or copolymers of these units have a high resistance to microbial damage and are therefore classified as biologically non-degradable. Oligomers of these polyamides having a maximum of 5 recurrent units are known to be biologically degradable (T. Fukumura in Plant Cell Physiology, Volume 7, 1966, page 93 et seq. and in Journal Biochemistry, Volume 59, 1966, page 531 et seq.).

The problem consisted of modifying relatively high molecular weight polyamides for packaging materials so that they would retain their good mechanical properties but would readily break down into biologically degradable fragments under certain environmental influences.

Canadian Patent Specification 975 491 describes photo degradable polyamides which contain keto groups in the side chain and in which the polymer chain contains units having the following structure:

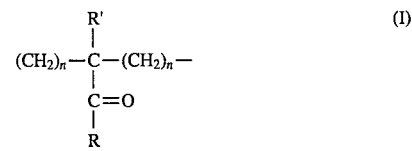

European Patent Application EP 0 347 687 relates to copolyamides which are degradable by the action of ultraviolet light and are obtainable by copolymerisation with keto carboxylic acids having the following structure:

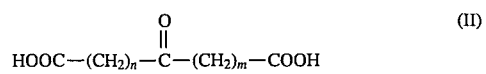

The above described solutions to the problem have, however, certain disadvantages. Although the copolymers prepared have a relatively improved photo-chemical degradability compared with unmodified polyamide systems, the ketone structure reacts with the diamine present or with lactam which has been opened to form ω-aminocarboxylic acid to form the corresponding Schiff's bases which cause discolouration and in some cases also branching, which in turn impairs the mechanical properties and the degradability. Moreover, the monomers used must be specially prepared.

It was surprisingly found that mixtures of high molecular weight aliphatic polyamides and aliphatic polyesters or polycarbonates having molecular weights from 200 to 4000, preferably from 1000 to 3000 g/mol have excellent mechanical properties and in addition improved degradability. Further, the polyamide mixtures according to the invention do not have the above-mentioned disadvantages since they can be prepared from components available in technical quantities by simply mixing them.

The present invention relates to degradable aliphatic polyamide compositions based on ω-amino carboxylic acids or their lactams, in particular polycaprolactam or polyamides based on aliphatic dicarboxylic acids and aliphatic diamines each having 4 to 6 carbon atoms or copolymers of these units obtained by the addition of linear or slightly branched oligomeric, aliphatic polyesters or polycarbonates having molecular weights from 800 to 4000 (preferably 1000 to 3000) in quantities from 5 to 25% by weight, preferably from 10 to 20% by weight.

The polyamides are preferably based on ε-amino caproic acid or caprolactam or on adipic acid and 1,6-hexamethylene diamine and copolymers of these two, optionally together with small quantities of another cycloaliphatic diamine such as, for example, 3,3,5-trimethyl-4-aminomethyl-cyclohexylamine. The weight average molecular weights $M_w$ of these polyamides are in the range of from 12,000 to 1,000,000, preferably from 30,000 to 800,000.

Suitable oligomeric aliphatic polyesters are those which have a molecular weight of from 800 to 4000, preferably from 1000 to 3000 g/mol and consist either of aliphatic diols and dicarboxylic acids each having up to 10 carbon atoms or of aliphatic polycarbonates of diols having up to 10 carbon atoms. They preferably have predominantly hydroxyl end groups.

Examples of suitable diols include ethylene glycol, diethylene glycol, 1,2-propylene glycol, dipropylene glycol, 1,3-propane diol, 1,4-butane diol, 1,6-hexane diol, 2,2-dimethylpropane diol and 1,10-dodecanol. A proportion of other diols or dicarboxylic acids may also be included. Suitable acids are, for example, succinic, glutaric, β-methylglutaric, adipic, pimelic, suberic, azelaic and sebacic acid. The method of preparation of such esters is known.

They are conventionally used for the preparation of polyurethane elastomers or foams.

Diols containing oxygen, e.g. diethylene glycol or 1,9-dihydroxy-5-oxa-nonane or also branched polyols such as trimethylol propane may be included, provided they give rise to polyesters which melt easily and are soluble in the polyamides. The polyester (carbonate) melting points are preferably below 120° C., more preferably below 80° C.

The additives may also be present as copolyester carbonates, e.g. based on carbonic acid, adipic.acid and diols.

The preparation of the mixtures according to the invention of commercial polyamide and linear aliphatic polyester is carried out in a conventional double shaft extruder, preferably with degassification. Melt compounding is carried out at temperatures above the melting point of the polyamide, in the region of 220° to 300° C., preferably from 230° to 270° C. The oligomeric polyesters are preferably added in a liquid form to facilitate accurate measuring and achieve homogeneous distribution. It may be necessary to melt the polyesters for this purpose.

The present invention further relates to the preparation of the polyamide mixtures, e.g. by mixing in the melt, (e.g. extruders) above the melting temperatures of the polyamides.

The mixtures according to the invention are suitable for the production of decomposable packaging materials such as films and thin walled injection moulded products for food packaging. The invention thus relates in particular to the use of the mixtures for packaging purposes.

Conventional additives may be added to the mixtures according to the invention in quantities suitable for their purpose, e.g. dyes, pigments, food additives such as starch, colour stabilizers, lubricants, anti-stick agents, etc.. The quantities in the mixture are normally from 0·01 to 2·5% by weight.

Experimental Part

10% by weight of a liquefied polyester of

A) hexane-1,6-diol and adipic acid having a molecular weight of 2000 g/mol or

B) of an aliphatic polycarbonate based on hexane-1,6-diol was added in a liquid form to a molten polycaprolactam of relative viscosity 3·0 determined in metacresol at 30° C. and molecular weight $M_w$=52,000 in a double shaft extruder at 240° C.

Extruded films 100 μm in thickness were produced from these materials in known manner. The mechanical properties of the films were determined by standardized processes (tension-E modulus according to DIN 53 457, tear resistance and elongation at break according to DIN 53 455). The results are summarized in Table 1.

TABLE 1

| Film properties of 100 μm extrusion films | | | |
|---|---|---|---|
| Property | A | B | Comparison |
| E modulus (N/mm²) | 1087 | 982 | 1191 |
| Tear resistance (N/mm²) | 431 | 315 | 272 |
| Elongation at break (%) | 58 | 48 | 55 |

The influence of light on degradation was determined by means of an Atlas Weather-o-meter, Model 65 WRC, filter: pyrex inside and outside, burner: 5400 W Xe burner, spray cycle: 102:18 (102 min light, 18 min light+rain), blackboard temperature: 60° C.±5, relative humidity: 50%±5.

Intensity of irradiation: 0·35 W/m² 340 nm 40 W/m² 300 to 400 nm.

The reduction in tear resistance and the elongation at break determined by a standardized process (DIN 53 455) were used as a measure of the degradability of the sample under investigation.

Finally, the films which had previously been damaged by exposure to weather for 1000 hours were subjected to a standardized test for biological degradability ASTM G 21-70. The results obtained are summarized in the following Table. The basic polyamide was used for comparison.

TABLE 2

| Damage on exposure to weathering | | | |
|---|---|---|---|
| Tear resistance (N/mm²) | A | B | Comparison |
| After 0 h | 58.6 | 42.5 | 552 |
| After 250 h | 28.9 | 24.1 | 391 |
| After 500 h | 4.8 | 10.0 | 320 |
| After 1000 h | 4.8 | 4.2 | 28.5 |
| Elongation at break (%) | A | B | Comparison |
| After 0 h | 437.6 | 315 | 272.0 |
| After 250 h | 119.3 | 105 | 231.7 |
| After 500 h | 7.4 | 12.5 | 199.5 |
| After 1000 h | 6.8 | 7.2 | 119.1 |

TABLE 3

| Assessment of the growth of micro organisms on weathered polyamide films (according to ASTM G 21-70) | |
|---|---|
| Example | Assessment |
| A | 4 |
| B | 3 |
| Comparison | 1 |

0 = no growth
1 = <10% of the surface covered by growth
2 = 10 to 30% covered (low growth)
3 = 3 to 50% covered (medium growth)
4 = 60 to 100% covered (vigorous growth)

We claim:

1. A biologically degradable film for food packaging consisting essentially of a) an aliphatic polyamide comprising polycaprolactam, a polyamide based on aliphatic dicarboxylic acids and aliphatic diamines wherein each of said aliphatic dicarboxylic acids and aliphatic diamines has 4 to 5 carbon atoms, or copolymers of these two; and b) a linear or slightly branched oligomeric, aliphatic polyester with a molecular weight of from 800 to 4000 g/mol in quantities of from 5 to 25% by weight.

2. The film according to claim 1, characterized in that the polyamide used is based on ε-amino caproic acid or caprolactam or on adipic acid and 1,6-hexamethylene diamine or on copolymers of these two, optionally with the addition of small quantities of other (cyclo)-aliphatic diamines and the weight average molecular weights $M_w$ of the polyamide is in the range of from 12,000 to 1,000,000.

3. The film according to claim 1, characterized in that the polyester consists of aliphatic diols and dicarboxylic acids each having from 2 to 10 carbon atoms.

4. The film according to claim 1, characterized in that the polyester has a molecular weight of from 1000 to 3000 g/mol.

5. The film according to claim 2, wherein the weight average molecular weights $M_w$ of the polyamide is in the range of from 30,000 to 800,000.

6. The film according to claim 1, wherein said films is 100 μm in thickness.

7. The film according to claim 2, wherein said films is 100 μm in thickness.

8. The film according to claim 6, wherein said film has a tension-E modulus of from 982–1087 N/mm$^2$, a tear resistance of from 315–431 N/mm$^2$ and an elongation at break of from 48–58%.

9. The film according to claim 7, wherein said film has a tension-E modulus of from 982–1087 N/mm$^2$, a tear resistance of from 315–431 N/mm$^2$ and an elongation at break of from 48–58%.

10. The film according to claim 1, wherein said polyester is an aliphatic polycarbonate.

11. The film according to claim 1, wherein said polyester is an aliphatic polycarbonate produced from diols having from 2 to 10 carbon atoms.

12. Biologically degradable thin walled injection moulded products for food packaging consisting essentially of a) an aliphatic polyamide comprising polycaprolactam, a polyamide based on aliphatic dicarboxylic acids and aliphatic diamines Wherein each of said aliphatic dicarboxylic acids and aliphatic diamines has 4 to 6 carbon atoms, or copolymers of these two; and b) a linear or slightly branched oligomeric, aliphatic polyester based on aliphatic diols and dicarboxylic acids each having up to 10 carbon atom, said polyester having a molecular weight of from 800 to 4000 g/mol.

13. Injection moulded products according to claim 12, characterized in that the polyamide used is based on ε-amino caproic acid or caprolactam or on adipic acid and 1,6-hexamethylene diamine or on copolymers of these two, optionally with the addition of small quantities of other (cyclo)-aliphatic diamines and the weight average molecular weight $M_w$ of the polyamide is in the range of from 12,000 to 1,000,000.

14. Injection moulded products according to claim 12, characterized in that the polyester consists of aliphatic diols and dicarboxylic acids each having from 2 to 10 carbon atoms.

15. Injection moulded products according to claim 12, characterized in that the polyester has a molecular weight of from 1000 to 3000 g/mol.

16. A biologically degradable film for food packaging consisting essentially of a) aliphatic polyamides comprising polycaprolactam, polyamides based on aliphatic dicarboxylic acids and aliphatic diamines wherein each of said aliphatic dicarboxylic acids and aliphatic diamines has 4 to 6 carbon atoms, or copolymers of these two; and b) linear or slightly branched oligomeric, aliphatic polyesters with molecular weights of from 800 to 4000 g/mol, said polyesters being present in said film in a quantity of from 5 to 25% by weight.

* * * * *

UNITED STATES PATENT AND TRADEMARK OFFICE
CERTIFICATE OF CORRECTION

PATENT NO.   : 5,512,339
DATED        : April 30, 1996
INVENTOR(S)  : DUJARDIN ET AL.

It is certified that error appears in the above-indentified patent and that said Letters Patent is hereby corrected as shown below:

On the title page, item[54] "DECOMPOSABLE PACKING MATERIAL"

should be -- DECOMPOSABLE PACKAGING MATERIAL --.

Column 4, line 53, "5 carbon atoms" should be -- 6 carbon atoms --;
Column 5, line 6, "films" should be -- film--;
Column 5, line 8, "films" should be -- film--.

Signed and Sealed this

Eighth Day of October, 1996

Attest:

BRUCE LEHMAN

Attesting Officer         Commissioner of Patents and Trademarks